Aug. 19, 1958    H. S. DALEY    2,848,354
YARN TREATING PROCESS AND APPARATUS
Filed Nov. 24, 1954
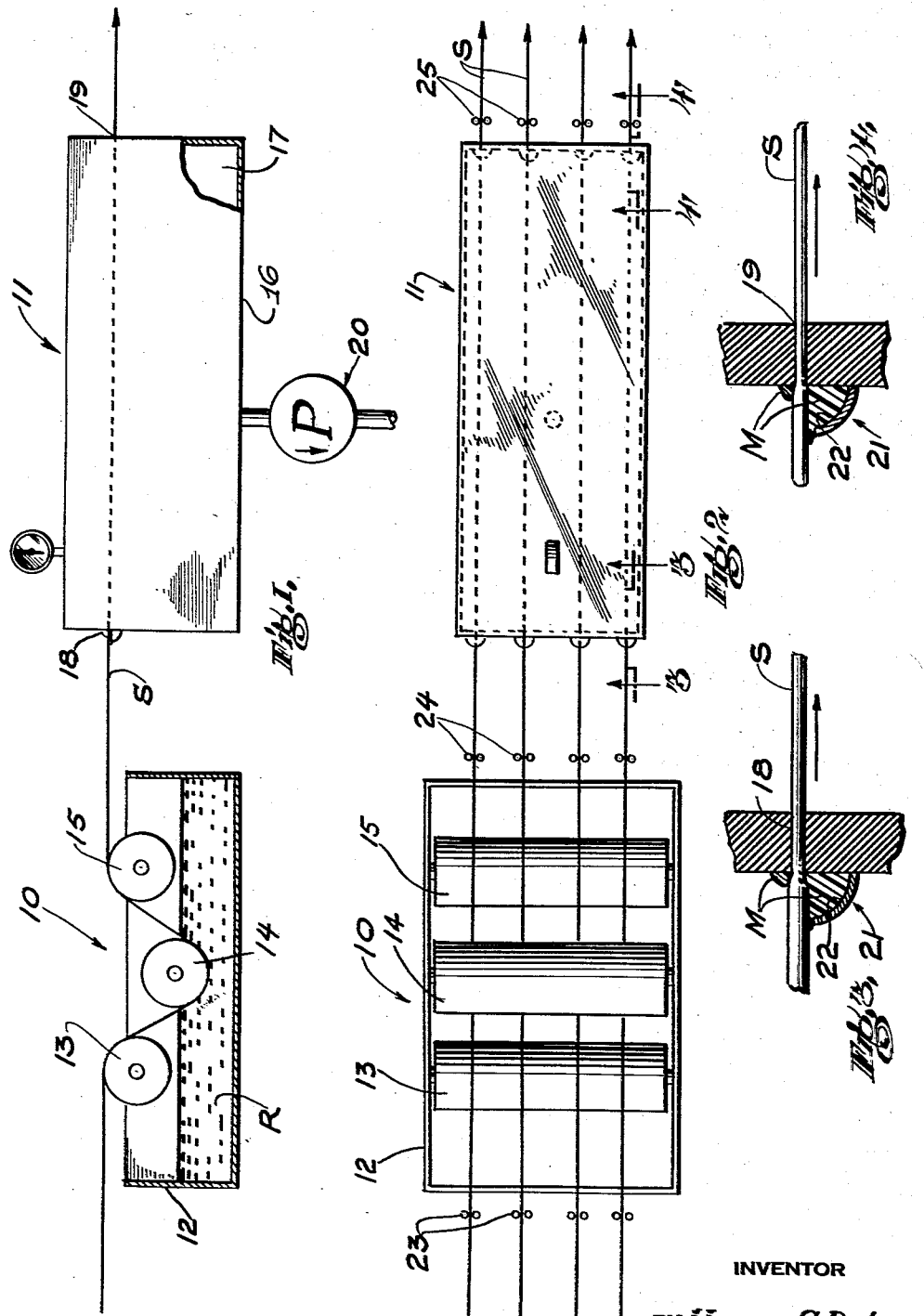
INVENTOR
BY Horace S. Daley
ATTORNEY

United States Patent Office 2,848,354
Patented Aug. 19, 1958

2,848,354
YARN TREATING PROCESS AND APPARATUS

Horace S. Daley, Clifton, N. J., assignor to Specialties Development Corporation, Belleville, N. J., a corporation of New Jersey Application November 24, 1954, Serial No. 470,940

6 Claims. (Cl. 117—102)

The present invention relates to yarn treating processes and apparatus, and, more particularly, to a process and apparatus for eliminating the entrapment of air in liquid resin impregnated yarns.

The present invention is primarily concerned with the manufacture of receptacles, such as cylinders or spheres and tubes or conduits for confining fluid medium under high pressure, which receptacles are composed of resin impregnated yarn windings, although certain aspects of the invention have utility in other arts.

It has been found that, when the yarn is passed through a liquid resin which is rather viscous to enable it to be readily cured and form a solid resinous mass for bonding the yarn windings to produce a receptacle wall structure, a considerable amount of air is entrapped and sealed between the fibers and filaments of which the yarn is composed. Upon curing the resin to its solid state, the entrapped air produces voids in the wall structure which greatly weakens the same.

Accordingly, an object of the present invention is to provide a process and apparatus which eliminates the entrapment of air in resin impregnated yarn, whereby wall structures can be produced from such yarn windings which have greater structural strength.

Another object is to accomplish the foregoing in a simple, practical and economical manner.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawing, forming a pair of the specification, wherein:

Fig. 1 is a schematic side view of apparatus for impregnating yarn with liquid resin and removing air entrapped in the yarn.

Fig. 2 is a schematic plan view apparatus similar to that shown in Fig. 1, illustrating the processing of a plurality of strands.

Figs. 3 and 4 are enlarged sectional views taken substantially along the lines 3—3 and 4—4, respectively, on Fig. 2.

Referring to the drawing in detail, apparatus is shown which essentially comprises impregnating means 10 and vacuumizing means 11 adjacent the delivery end of the impregnating means.

The impregnating means 10, shown by way of example, comprise a receptacle 12 containing a liquid resin R which is rather viscous, and a plurality of rolls 13, 14 and 15, or the like, for passing one or more strands S of yarn through the resin.

The vacuumizing means 11 comprise a casing 16 providing a confined zone or chamber 17 at the interior thereof and having one or more entrance holes 18 at the end thereof adjacent the impregnatnig means 10 and having one or more exit holes 19 at the opposite end, with the respective entrance and exit holes in alignment to enable a strand S to pass therethrough; a vacuum pump 20 having its inlet connected in fluid flow communication with the chamber 17 for evacuating the chamber to provide a partial vacuum therein; and a gauge connected to the chamber for indicating the pressure conditions therein.

Preferably, the holes or openings 18 and 19 are circular apertures or short and narrow slits which are dimensioned to bring the strands in wiping contact with the structure providing the same, whereby excess resin is removed from the strands and is accumulated at the openings to provide a mass M of resin about the strands which seals the openings but permits the strands to pass freely therethrough without any undesirable tensioning thereof. In this manner, the openings are sealed effectively to enable a partial vacuum of about 25 inches of mercury to be maintained in the chamber 17, which partial vacuum is capable of removing air entrapped in the strands by the resin.

If desired, the mass of resin may be collected by means, such as a small trough-like element 21 (Figs. 3 and 4) positioned adjacently below each of the openings at the strand entrance side thereof and having a recess 22 therein for receiving and accumulating the resin removed from the strands to maintain a mass of resin at the openings.

When a plurality of strands are treated, as shown in Fig. 2, it is desirable to guide the same in spaced apart relation through the impregnating and vacuumizing means. This may be accomplished by three sets of spaced pins or combs 23, 24 and 25, one at the incoming end of the impregnating means, one between the impregnating and vacuumizing means and one at the delivery end of the vacuumizing means.

In practicing the process in accordance with the present invention, one or more strands S are drawn from a source of supply (not shown), and are passed through the liquid resin R to impregnate and coat the same with an excess of resin. The strands are then passed through the entrance openings where a portion of the excess resin is wiped therefrom to accumulate the mass of resin M which seals the entrance openings, through the chamber 17 wherein entrapped air is removed from the strands, and through the exit openings where additional excess resin is wiped therefrom to accumulate the mass of resin M which seals the exit openings. The so treated strands are free of entrapped air and are delivered to apparatus (not shown) for applying the same as windings in the manner previously mentioned herein.

The foregoing process and apparatus are particularly adapted for use in connection with viscous type liquid resins such as epoxy or modified epoxy resin, polyester type resins, acrylic resins, and solvent modified silicone and phenolic resins. Such resins have a tendency to entrap air but also form good seals for the vacuumizing chamber thus facilitating the establishment of a partial vacuum sufficient to remove such entrapped air.

The term yarn is used herein in a broad sense and is intended to include yarns formed of natural or synthetic fibers or filaments between which air can be entrapped.

In view of the foregoing description, it will be seen that the present invention provides a simple, practical and economical process and apparatus for impregnating yarn in a manner to remove entrapped air therefrom.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. The process of treating yarn comprising the steps of impregnating a strand of yarn with a liquid resin, passing the strand through the atmosphere, passing the strand through a confined zone maintained under a partial vacuum but having entrance and exit holes for the strand, wiping excess resin from the strand at the holes to provide an accumulation of resin adapted to substantially seal the holes, and passing the strand directly to the atmosphere upon leaving the exit hole.

2. Apparatus for treating yarn comprising, in combination, means including a receptacle open to the atmosphere and adapted to contain a mass of material for impregnating a strand of yarn; a casing having a chamber therein provided with entrance and exit openings through which the impregnated strand is adapted to pass, said receptacle being located exteriorly of said chamber and being arranged to maintain the material therein out of fluid flow communication with said chamber; means at each of said openings for removing surplus impregnating material from the yarn and collecting the same to form a seal about the strand at said openings between said chamber and the atmosphere; and means for evacuating said chamber to remove air entrapped in the strand by the resin.

3. Apparatus according to claim 2, wherein said openings are dimensioned to pass the strand in wiping contact with the structure providing said openings.

4. Apparatus according to claim 2, wherein means are provided for simultaneously guiding a plurality of strands through said impregnating means and said chamber including means for maintaining the strands spaced apart from each other.

5. Apparatus according to claim 2, including means adjacently below said openings at the strand entrance side thereof for maintaining the surplus material adjacent said openings.

6. Apparatus according to claim 5, wherein said last mentioned means are trough shaped elements having a recess for receiving the surplus material.

References Cited in the file of this patent

UNITED STATES PATENTS

| | | |
|---|---|---|
| 1,322,327 | Minton | Nov. 18, 1919 |
| 1,587,652 | Johnston | June 8, 1926 |
| 1,595,475 | Minton | Aug. 10, 1926 |
| 1,698,886 | Johnston | Jan. 15, 1929 |
| 1,805,145 | Koops | May 12, 1931 |
| 2,405,220 | Mann | Aug. 6, 1946 |